(12) United States Patent
Drnevich et al.

(10) Patent No.: US 7,690,204 B2
(45) Date of Patent: Apr. 6, 2010

(54) METHOD OF MAINTAINING A FUEL WOBBE INDEX IN AN IGCC INSTALLATION

(75) Inventors: Raymond Francis Drnevich, Clarence, NY (US); Troy Michael Raybold, Orchard Park, NY (US)

(73) Assignee: Praxair Technology, Inc., Danbury, CT (US)

( * ) Notice: Subject to any disclaimer, the term of this patent is extended or adjusted under 35 U.S.C. 154(b) by 1181 days.

(21) Appl. No.: 11/248,387

(22) Filed: Oct. 12, 2005

(65) Prior Publication Data

US 2007/0082306 A1   Apr. 12, 2007

(51) Int. Cl.
  *F02C 6/18* (2006.01)
(52) U.S. Cl. ........................................ 60/780
(58) Field of Classification Search .................. 60/780, 60/39.18, 723, 801, 39.464, 39.465; 431/12
  See application file for complete search history.

(56) References Cited

U.S. PATENT DOCUMENTS

| | | | | |
|---|---|---|---|---|
| 5,392,594 | A * | 2/1995 | Moore et al. ................... | 60/781 |
| 5,865,023 | A * | 2/1999 | Sorensen et al. ............... | 60/775 |
| 6,082,092 | A | 7/2000 | Vandervort ................ | 60/39.03 |
| 6,343,462 | B1 | 2/2002 | Drnevich et al. ........... | 60/39.05 |
| 6,502,402 | B1 | 1/2003 | Smith et al. ................... | 60/775 |
| 6,896,707 | B2 | 5/2005 | O'Rear et al. ................. | 44/300 |

FOREIGN PATENT DOCUMENTS

GB   1366484   9/1974

OTHER PUBLICATIONS

Ekstrom et al., "Heavy Duty Gas Turbine Combustion Tests With Simulated Low BTU Coal Gas", U.S. Department of Energy Conference (1993).
Griffiths et al., "Evaluation of Options for Adding CO2 Capture to ChevronTexaco IGCC", Jacobs Consultancy, presented at the 2003 Gasification Technologies Conference (2003).

* cited by examiner

*Primary Examiner*—Michael Cuff
*Assistant Examiner*—Gerald L Sung
(74) *Attorney, Agent, or Firm*—David M. Rosenblum

(57) ABSTRACT

A method of reducing a modified Wobbe index of a fuel stream fed to diffusion combustors of a gas turbine that is used in connection with an IGCC installation in which a nitrogen stream is fed into the head ends of the combustor of NOx control and the modified Wobbe index of the fuel stream has been increased in an amount that is greater than at least about 10 percent of a design Wobbe index for the fuel to be fed to the gas turbine. The reason for the increase is the conversion of the carbon monoxide within the fuel stream to hydrogen and carbon dioxide by a water gas shift reaction and subsequent removal of the carbon dioxide. The nitrogen stream is maintained at the same level both with and without conversion and subsequent removal of carbon atoms. The nitrogen stream is divided to subsidiary streams that are respectively fed into the head end of the combustors and that are mixed with a fuel to lower the modified Wobbe index to acceptable levels for the gas turbine.

8 Claims, 3 Drawing Sheets

METHOD OF MAINTAINING A FUEL WOBBE INDEX IN AN IGCC INSTALLATION

FIELD OF THE INVENTION

The present invention relates to a method maintaining a modified Wobbe index in an IGCC installation. More particularly, the present invention relates to such a method in which the modified Wobbe index of the fuel to a gas turbine of such installation is increased by a water gas shift reactor and subsequent removal of the carbon dioxide to a level above a design modified Wobbe index for the gas turbine. Even more particularly, the present invention relates to such a method in which part of a nitrogen stream is mixed with the fuel stream to lower the modified Wobbe index towards the design modified Wobbe index.

BACKGROUND OF THE INVENTION

Integrated gasification combined cycles known as IGCC cycles employ a gasifier to gasify coal into a fuel gas containing hydrogen, carbon monoxide, carbon dioxide and possibly methane. The fuel gas is fed to a gas turbine to generate electrical power. Oxygen for the gasification of the coal is supplied by an on-site air separation plant that also produces nitrogen. In many situations most or all of the nitrogen is introduced into the head end of the gas turbine combustors for NOx control and for power augmentation.

Gas turbine fuel delivery systems are designed to provide the gas turbine with a controlled fuel energy input measured in BTU/hour and based upon the lower heating value of the fuel. This is accomplished by supplying fuel to the gas turbine combustor at a specific pressure via control valves, orifices or nozzles. For a given fuel system design, the turbine energy input is controllable with a specific set of control valves, orifices and nozzles as long as a quantity $[LHV_g/(MW_g T_g/28.96)^{0.5}]$ known as the modified Wobbe index remains constant. For this reason, the modified Wobbe index is considered a measure of fuel interchangeability. That is, fuels with various $LHV_g$ (lower heating values), $MW_g$ (molecular weights) and $T_g$ (gas temperature) can be accommodated by a given fuel delivery system, as long as the modified Wobbe index closely matches the design value. Typically, gas turbine manufacturers allow for ±5-10 percent deviations from the design modified Wobbe index. Of course, other constraints may also be imposed by the turbine manufacturer, such as $LHV_g \geqq 200$ BTU/scf to ensure proper combustor operation or $T_g \leqq 550°$ F. to protect materials of construction.

Given the fact that the composition of gas turbine fuels can vary, for example, natural gas, it has long been known to adjust the modified Wobbe index of the fuel to meet design specifications with the addition of nitrogen or other inert gas. For example, in GB 1 366 484, the Wobbe index of natural gas from the North Sea is lowered by the introduction of nitrogen to meet specifications involving natural gas from continental sources.

U.S. Pat. No. 6,896,707 relates to a situation in which a turbine is used in connection with a gas to liquids facility that employs a Fischer-Tropsch process. It is advantageous to supply fuel to the gas turbine that is derived from a tail gas produced by the Fischer-Tropsch process. However, this tail gas is not always available and hence natural gas has to be substituted in some instances. Since the tail gas includes hydrogen, carbon monoxide and carbon dioxide, it does not have as high a heating value as that possessed by natural gas. Hence, the use of these two fuels presents compatibility problems related to their differing Wobbe index. In order to solve this problem, the Wobbe indices of the natural gas and or the tail gas are adjusted so that both are compatible. In the specific embodiment, the low Wobbe index fuel can be increased by removing the carbon dioxide and the high Wobbe index fuel can be decreased by adding carbon dioxide. In another example, a natural gas stream is blended with nitrogen to provide a blend with a lower Wobbe index than the starting natural gas.

In yet another method of adjusting the Wobbe index of fuel, U.S. Pat. No. 6,082,092 discloses a control system for a gas turbine in which the Wobbe index is computed for the fuel and a feedback signal is provided to change the temperature of the fuel supplied to the gas turbine combustor to change the Wobbe index of the fuel. In yet another method of adjusting Wobbe indices of fuel, a dry fuel gas is saturated with water and the Wobbe index is adjusted by adjusting the flow of the recycled water to the saturator.

One advantage of IGCC plants for coal-based power generation is that equipment can be installed for carbon dioxide removal in a very cost effective manner. The need to remove carbon dioxide emissions can be regulatory in nature. However, it also may be desirable to remove carbon dioxide for its value as a product or an agent in other processes that may take place near the IGCC facility. Such processes include enhanced oil recovery operations in which the carbon dioxide is injected down hole. It therefore can become valuable to retrofit the IGCC facility with a water gas shift reactor in which the carbon monoxide content of the stream is reacted in a known manner with water to produce additional hydrogen and carbon dioxide. The carbon dioxide can then be conventionally removed, by such well-known techniques as those involving absorption towers.

When adding the carbon dioxide removal system, the problem of fuel compatibility will arise. In case of a retrofit installation, the gas turbine will have to be modified to accept a higher Wobbe index fuel due to the change in composition of the fuel.

Further complicating the problem is that NOx emissions are currently regulated and in current IGCC plants a diffusion combustor is used in which nitrogen is added to the head end of the combustor as a diluent to lower flame temperature. Nitrogen is produced by an on-site air separation plant that also produces oxygen for the gasifier. In case of retrofit installations, the most expeditious and cost effective solution is one that will not involve a modification of the air separation plant and its controls.

As will be discussed, the present invention provides a method of adjusting the modified Wobbe index of a fuel produced in an IGCC installation that has varied from an original design level in a cost effective manner.

SUMMARY OF THE INVENTION

The present invention relates to a method of reducing a modified Wobbe index of a fuel stream fed to diffusion combustors of a gas turbine to be used in an IGCC installation in which a nitrogen stream is fed into the head ends of the combustors to lower NOx produced by combustion within the combustors. The method is applied to situations in which the modified Wobbe index of the fuel stream has been increased in an amount that is greater than at least about 10 percent of a design modified Wobbe index for the gas turbine due to a retrofit of the IGCC installation involving the conversion of carbon monoxide within the fuel stream to hydrogen and carbon dioxide by a water gas shift reaction and subsequent removal of the carbon dioxide prior to the introduction of the fuel stream into the combustors. It is to be noted that as been indicated above, as used herein and in the claims, the term "modified Wobbe index" means an index determined from the formula: $[LHV_g/(MW_g T_g/28.96)^{0.5}]$, where $LHV_g$ is the lower heating value of the fuel in BTU/scf, $MW_g$ is the molecular weight of the fuel and $T_g$ is the temperature of the fuel in degrees Rankine.

In accordance with the method, the nitrogen stream is diverted to the fuel stream so that less nitrogen is introduced into the head end of the combustors after the retrofit by dividing the nitrogen stream into first and second subsidiary streams. The first subsidiary stream is fed into the head end of the combustor and the second subsidiary stream is combined with the fuel stream prior to the introduction of the fuel stream into the combustor. The second subsidiary stream is provided with a subsidiary flow rate that is selected to at least partially lower the modified Wobbe index of the fuel stream after mixing thereof with the second subsidiary stream to within about 10 percent or less of the design modified Wobbe index.

Hence, in a method in accordance with the present invention changes to the gas turbine and its control system are minimized because in carrying out the present invention in its most basic sense, all that is required to operate the gas turbine, without modification to its controls and combustors, is to add piping and a valve and a booster compressor to divert the nitrogen from the head end of the combustor to the fuel stream. It is to be noted that the diversion of the nitrogen from the head end of the combustor to the fuel stream is possible in that gas turbine controls are designed to operate at no load conditions or in other words less than about 30 percent of the fuel flow to the combustor under full load. Additionally, the nitrogen controls and the combustor nozzles are capable of managing fuel flows of less than about 50 percent without major changes. In fact, the fuel flow to a gas turbine is at about 50 percent of its normal fuel flow under full load when the gas turbine is being operated at about 35 percent of its output. Assuming no additional nitrogen is available, the result of the invention may be minimal or have a positive effect on NOx production in that it has been found that slightly lower NOx levels are achievable when nitrogen is blended with the fuel as opposed to be injected into the combustor. However, if additional nitrogen is available due to plant capacity, this problem may be solved by increasing the flow of nitrogen to allow for an increase of between about 5 percent and about 10 percent. Another possibility is to divert less nitrogen to the fuel and yet, adjusting the modified Wobbe index thereof by the addition of moisture. In both cases, less nitrogen would flow to the head end of the combustors than was contemplated prior to the retrofit or in the case where the gas turbine is modified to operate with the hydrogen-rich fuel at the unadjusted modified Wobbe index. Another possibility to deal with increased NOx production would be to operate the gas turbine at a lower turbine inlet temperature.

The subsidiary flow rate of the second subsidiary stream can be selected to fully lower the modified Wobbe index of the fuel stream to within about 10 percent or less of the design modified Wobbe index or in other words be effective without additional heating beyond that used before the retrofit or moisture addition to the fuel stream. In such cases and where the IGCC installation has a fluidized bed gasifier the subsidiary flow rate of the second subsidiary stream is between about 10 percent and about 45 percent of the flow rate of the nitrogen stream. In case of an entrained-flow slurry-fed gasifier, the subsidiary flow rate of the second subsidiary stream is within at least about 10 percent and about 40 percent of the flow rate of the nitrogen stream. In case of the fluidized bed gasifier, at least 20 percent and about 80 percent of the total carbon contained in the fuel stream has been removed due to the retrofit. With respect to the entrained-flow slurry-fed gasifier, between about 20 percent and about 90 percent of the total carbon contained in the fuel stream has been removed due to the retrofit. Again in cases in which the second subsidiary stream alone serves to lower the modified Wobbe index and the IGCC installation utilizes an entrained-flow, dry-fed gasifier, the subsidiary flow rate of the second subsidiary stream is between about 1 percent and about 35 percent of the flow rate of the nitrogen stream and between about 20 percent and about 90 percent of the total carbon contained in the fuel stream has been removed due to the retrofit. In cases in which the IGCC installation utilizes a moving bed gasifier, more than 50 percent of the nitrogen stream would have to be diverted to the fuel stream in order to effectively lower the Wobbe index at lower temperatures. This type of operation is not desirable, as mentioned above, due to the need to modify the gas turbine installation. Therefore either heating or moisturization is required to lower the modified Wobbe index towards design levels. In this regard, for such an installation, the subsidiary flow rate is between about 35 percent and about 50 percent of the flow rate of the nitrogen stream and between about 45 percent and about 85 percent of the total carbon contained in the fuel stream has been removed due to the retrofit.

It is to be noted that in any embodiment of the present invention, moisture can be added to the fuel stream, the fuel stream can be heated or both moisturized and heated to also lower the modified Wobbe index.

BRIEF DESCRIPTION OF THE DRAWINGS

While the present invention concludes with claims distinctly pointing out the subject matter that Applicants regard as their invention, it is believed that the invention will be better understood when taken in connection with the accompanying drawings in which:

DETAILED DESCRIPTION

Figure 1:
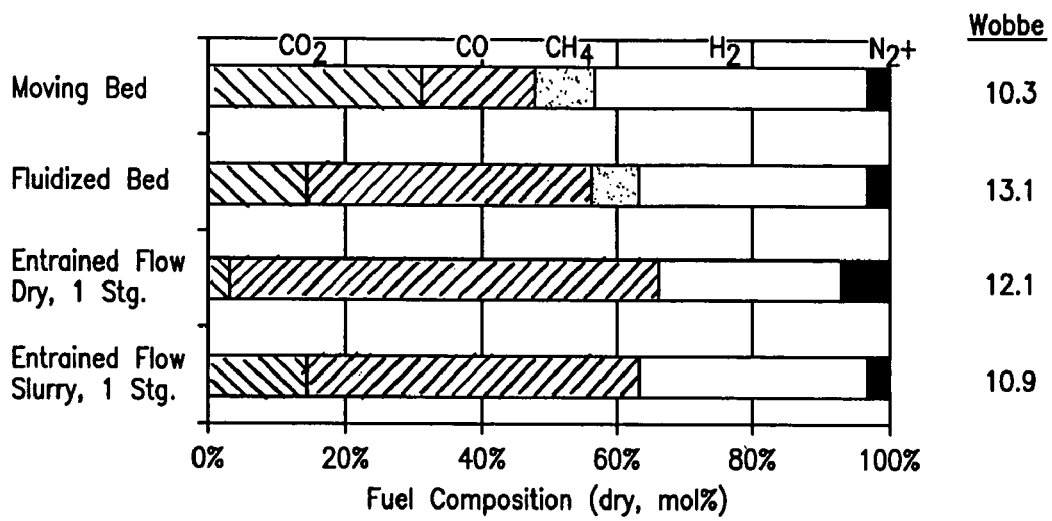
FIG. 1 is a chart of compositions of fuel gas streams and related Wobbe indices of the fuels that are produced in IGCC installations employing various gasifiers and where there is no water gas shift reaction and carbon dioxide removal.

With reference to FIG. 1, the expected fuel compositions are illustrated that are produced by an IGCC installation in which there is no water gas shift reactor or carbon dioxide removal. It is to be noted that the term "moving bed gasifier" as used herein and in the claims relates to a particular type of gasifier in which the coal is fed to the top of the gasifier and moves in a countercurrent direction to hot gases that originate in the bottom of the gasifier by the injection of steam and oxygen (i.e. a stream containing at least about 75 mol % oxygen) to produce a fuel gas having calorific components, principally hydrogen and carbon monoxide. A "fluidized bed" gasifier as used herein and in the claims is one in which oxygen and steam are used to fluidize ground coal in a reactor to produce the fuel gas. The term "entrained-flow, dry" appearing in the figures means an "entrained-flow, dry-fed gasifier" which as used herein and in the claims means a gasifier in which coal is pulverized and fed in the reactor with a carrier gas. Oxygen and steam are injected and the solids drop out the bottom. The hot gases produced in the reactor pass through a cooling section. The term "entrained-flow slurry" used in the figures means an "entrained-flow, slurry-fed gasifier" which as used herein and in the claims means a gasifier in which a slurry of coal and water is produced that consists of about 65 percent coal. This is injected into a burner system of the gasifier. As can be seen from FIG. 1, the modified Wobbe index at 300° F. varies from between about 10.3 to 13.1 for fuel gases produced by the various gasifiers.

Figure 2:
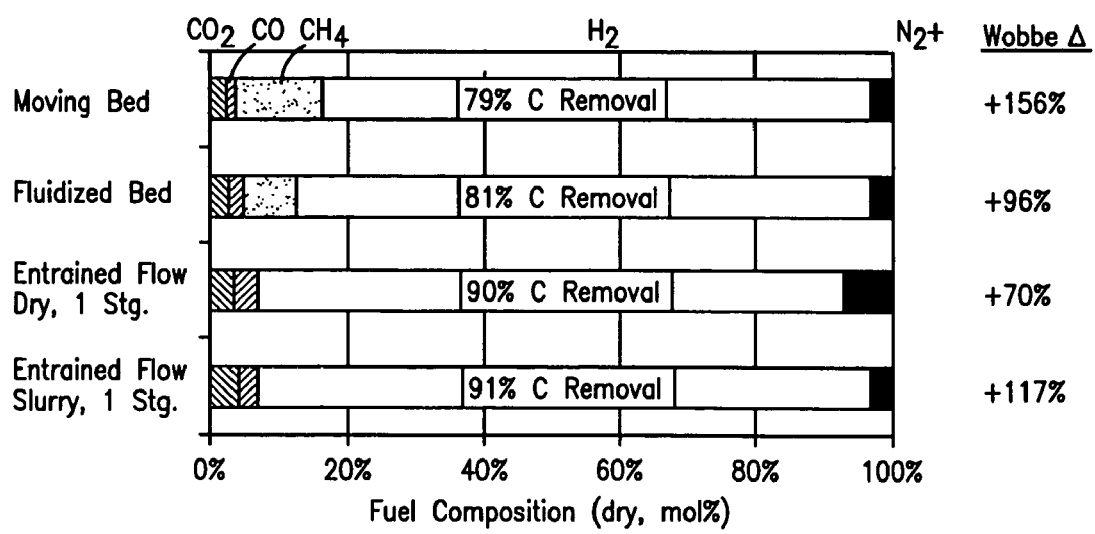
FIG. 2 is a chart of fuel gas compositions of fuel gases and related Wobbe indices produced by IGCC installations employing various gasifiers and where there exists a water gas shift reactor and subsequent carbon dioxide removal.

With reference to FIG. 2, fuel compositions are illustrated for the gasifiers discussed with respect to FIG. 1 in which now the fuel stream produced by the gasifier is subjected to water gas shift followed by carbon dioxide removal. In this illustration it is assumed that about 95 percent of the carbon monoxide has shifted to carbon dioxide and approximately 95 percent of the carbon dioxide is subsequently removed. As illustrated, the Wobbe indices have increased by between about 70 percent to about 156 percent. The streams could not be utilized in connection with the control skid of the gas turbine fuel supply system and the gas turbine combustors that have been designed to operate on the fuel compositions illustrated in FIG. 1. If such fuel control systems and gas turbine combustors were to be used, the same would have to be modified by provision of the nozzles and flow orifice plates and possibly additional programming to handle fuel streams of FIG. 2 having the much increased Wobbe indices over a Wobbe index for the fuel composition for which the gas turbine has been designed. Such modified Wobbe index of fuels for which the gas turbine has been designed before any retrofit involving carbon monoxide shift and carbon dioxide removal as used herein and in the claims is referred to as "the design Wobbe index".

Figure 3:
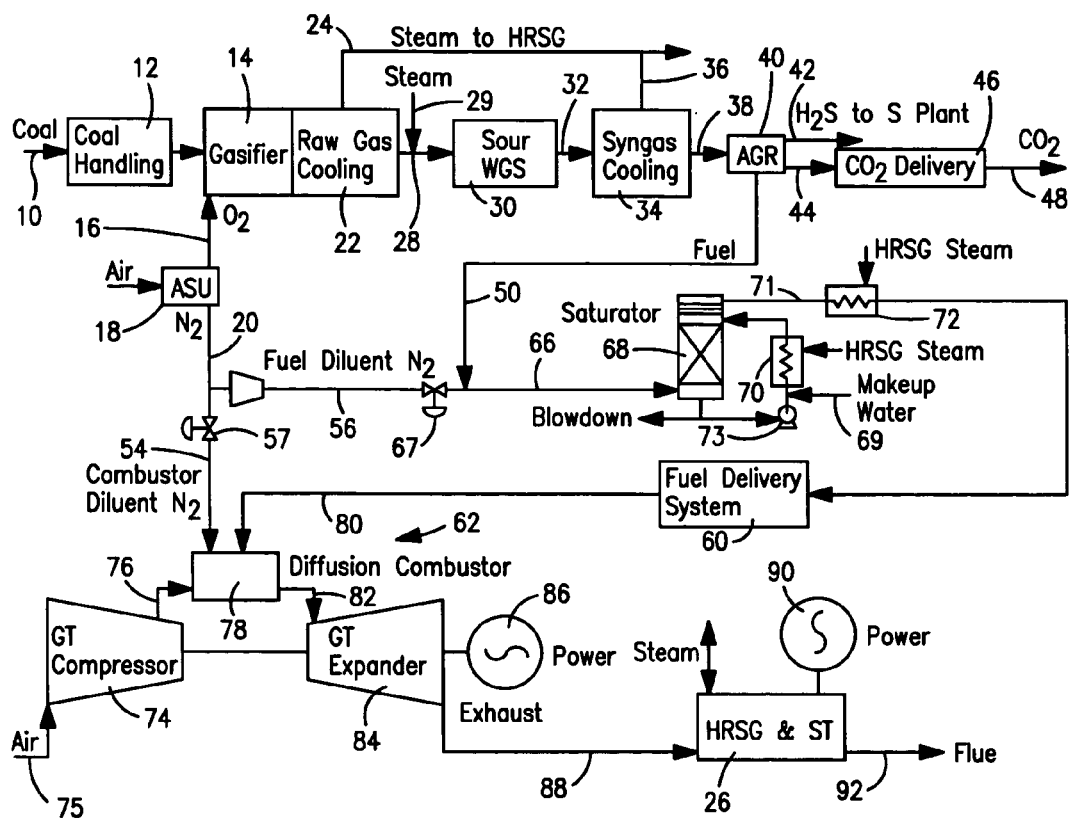
FIG. 3 is a schematic of an IGCC installation using a water gas shift reactor followed by carbon dioxide removal and that is specifically configured to carry out a method in accordance with the present invention.

With reference to FIG. 3, an IGCC installation 1 is illustrated in which coal 10 is subjected to coal handling as illustrated in block 12. Coal handling of block 10 would consist of a rail yard, coal piles, conveyors, coal sizing and possibly slurry preparation. The coal after having been handled is fed to a gasifier 14 which can be any one of the gasifiers mentioned above, for instance, a moving bed gasifier, a fluidized bed gasifier and an entrained-flow, dry-fed gasifier or an entrained-flow, slurry-fed gasifier.

Injected into the gasifier 14 is an oxygen stream 16 produced by an air separation unit 18. Air separation unit 18 fractionates in air stream 19 by cryogenic rectification into oxygen stream 16 and a nitrogen stream 20. Oxygen stream 16 preferably has a purity of approximately between about 80 percent and about 95 percent. Nitrogen stream 20 has a purity of between about 95 percent and about 99 percent. As is well known in the art, in a cryogenic rectification plant air is compressed and cooled to at or near its dew point and rectified within columns having mass transfer elements such as sieve trays or structured packing to produce the nitrogen and oxygen. Typically, as well known in the art, the air is successively refined in columns operating at higher and lower pressures and that are connected in a heat transfer relationship by a condenser-reboiler. The oxygen after having been vaporized and the nitrogen produced by the air separation unit is compressed to form oxygen stream 16 and nitrogen stream 20. Typically, the nitrogen stream 20 has a pressure of about 50 psig above stream 76 from a gas turbine compressor 74 to be discussed.

The hydrogen and carbon monoxide containing fuel gas produced by gasifier 14 is then subjected to raw gas cooling as indicated in block 22 having heat exchangers that produce a steam stream 24 that is routed to heat recovery steam generator 26 for superheating. The gas exiting from the heat exchangers typically has a temperature of anywhere from between about 400° F. and about 800° F. Preferably, the resultant cooled stream 28 has a temperature of approximately 550° F. and is introduced along with a steam stream 29 into a known water gas shift reactor 30 that reacts water and carbon monoxide to produce additional hydrogen and carbon dioxide in a known manner. Steam stream 29 may not be needed if an entrained-flow, slurry-fed gasifier is used. Shifted stream 32 is then subsequently cooled in heat exchangers that are generally illustrated by syngas cooling block 34. From such syngas cooling steam stream 36 is produced that is also routed to heat recovery steam generator 26.

Cooled synthesis gas stream 38 is then subjected to acid gas removal as generally indicated by block 40. Such acid gas removal is effectuated in absorption columns, for example, amine or SELEXOL units. This produces a hydrogen sulfide gas containing stream 42 that can be routed to a sulfur plant. Additionally, carbon dioxide is removed as a carbon dioxide stream 44 that can be dried and subsequently compressed to pipeline pressure of approximately 2000 psig as indicted by carbon dioxide delivery block 46. From this, a high pressure, dry carbon dioxide stream 48 is produced. As indicated previously, the dry carbon dioxide stream 48 can be sequestered, utilized for enhanced oil recovery possibly or for other carbon dioxide consuming industrial processes.

As a result of the acid gas removal, a fuel stream 50 is produced having the composition illustrated in FIG. 2. The composition would depend upon the type of gasifier utilized for gasifier 14.

In accordance with the present invention, nitrogen stream 20 is divided into a first subsidiary stream 54 and a second subsidiary stream 56. In practice, nitrogen stream 20 has a flow rate that varies in proportion to the fuel stream being fed into the combustors of the gas turbine to be discussed. The fuel flow rate of such fuel stream will vary with the desired power output of the gas turbine and therefore so will the flow rate of nitrogen stream 20. The flow rate of nitrogen stream 54 is controlled by a control valve 57 that is activated by the fuel delivery system. This proportion in the flow rates is typically adjusted so that the total flow of nitrogen into the combustors and the fuel when mixed have a lower heating value that is no less than about 100 BTU/scf. The flow control valve 57 is controlled by a fuel delivery system 60 that controls the fuel fed to a gas turbine 62 to be discussed hereinafter.

The second subsidiary stream 56 has its pressure raised by a booster compressor 64 by about 30 psi due to the pressure drop associated with the components of the fuel delivery system 60. Second subsidiary stream 56 is then combined in fuel stream 50. The flow rate of second subsidiary stream 56 is controlled by a control valve 67 which can be actuated by automated controls. Since for a given plant operating load and level of carbon capture, the fuel flow and its composition is known, the amount of diluent required to meet a design Wobbe index can be predetermined. Alternatively, the Wobbe index of the mixed fuel and nitrogen stream may be determined using a known analyzer, for example, a calorimeter and compared to the design Wobbe index. The difference may be defined as an objective function in a control loop used to set control valve 67.

In order to also lower the modified Wobbe index, the resultant fuel stream 66 produced by the addition of nitrogen into fuel stream 50 can optionally have moisture added to it by a saturator 68. A circulating water stream (including makeup water stream 69) is heated in a heat exchanger 70 by low pressure (approximately 150 psig) steam generated in heat recovery steam generator 26 to a temperature of between about 200° F. and about 350° F. and introduced into saturator 68 for contact with the fuel stream 66. Alternative sources of heat would be from hot boiler feed water from heat recovery steam generator 26 or from pre-cooling for acid gas removal unit 40. A circulation pump 73 is provided to circulate water. The saturated fuel stream 71 is then heated within heat exchanger 72 by low pressure or medium pressure steam generated in heat recovery steam generator 26 to a temperature of at least about 50° F. above the saturation temperature. As can be appreciated, in appropriate instances, fuel stream 66 might be subjected to either heating or moisture addition alone. It is to be further noted that the heating of the fuel stream with nitrogen added or its moisturization could be accomplished by moisturizing and/or heating either fuel stream 50 or second subsidiary stream 56 alone or on both streams after mixing as shown in FIG. 3.

Fuel stream 66 or saturated fuel stream 71 if used is then fed to a fuel delivery system 60 that consists of a control skid for a gas turbine 62 to control the amount of fuel being fed to the gas turbine 62.

Gas turbine 62 consists of a gas turbine compressor section 74 in which air 75 is compressed to form a compressor air stream 76 that is fed into a combustor 78 along with a fuel stream 80 that consists of fuel stream 66 or saturated fuel stream 71 after having been metered. First subsidiary nitrogen stream 54 is fed into the head end of the combustors 78 for NOx control. The gas turbine can be, for example, a model 7FA turbine manufactured by the General Electric Company of Schenectady, N.Y., U.S.A. Hot gases produced by combustor 78 as a hot gas stream 82 are expanded in the gas turbine expander 84. Work is recovered from such expansion by electrical generation as indicated at 86. The exhaust stream 88 which can be subjected to heat recovery and steam generation within heat recovery steam generator 26 that is connected to a steam turbine 90 for power generation. The resultant exhaust is discharged as a flue gas stream 92 from the installation.

As indicated above, a central feature of the present invention is to allow an IGCC installation to be retrofitted for shift conversion and carbon dioxide removal with minimal changes to the operation of air separation unit 18, its controls and piping and to minimize any changes to the gas turbine system. Typically, the flow rate of the nitrogen stream 20 and fuel stream 80 will be proportioned as outlined above. Hence, as more fuel is fed to gas turbine 62 for power generation requirements, more nitrogen will also be fed and as indicated above this does not change whether or not the gasified coal is shifted and subjected to carbon dioxide removal.

Figure 4:
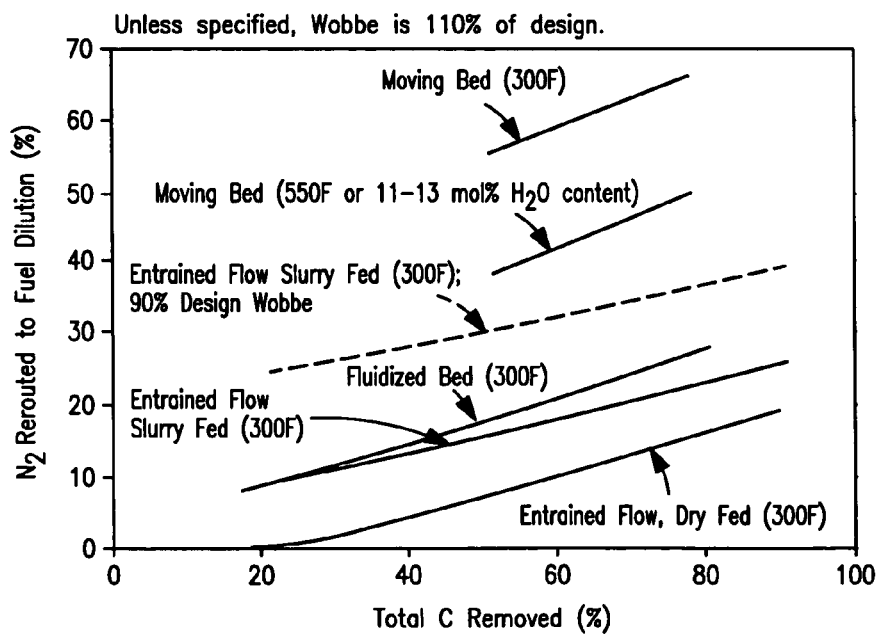
FIG. 4 is a graphical representation for various gasifiers of percentages of nitrogen that are rerouted from the head end of the combustors that is necessary to carry out a method in accordance with the present invention.

As indicated by FIG. 4, the amount of diversion of nitrogen into subsidiary nitrogen 56 that will be required will depend upon the total amount of carbon that has been removed from gasified stream and the particular type of gasifier used. FIG. 4 considers such diversion in which stream 66 is used without any saturation or any heating of the fuel stream 66 beyond the heating before the retrofit. In case of the entrained-flow, dry-fed gasifier, at a typical temperature of 300° F. and in order to obtain a modified Wobbe index of about 110 percent of the design Wobbe index, at the low end of 20 percent of the total carbon removed, there is a diversion of about 1 percent of the nitrogen stream 20. As a possible rate of removal of carbon rises to about 90 percent, the amount of nitrogen rises to about 20 percent. Levels of carbon removal are indicated for the fluidized bed and an entrained-flow, slurry-fed gasifiers in which the amount of nitrogen diverted in second subsidiary stream 56 is approximately between about 10 percent and about 25 percent of nitrogen stream 20 at low and high ends of carbon removal. The possible range of carbon removal for the fluidized bed gasifier is between about 20 percent and about 80 percent. The range of carbon removal for the entrained-flow, slurry-fed gasifer is between about 20 percent and about 90 percent.

The foregoing ranges assume that the modified Wobbe index has been lowered to about 110 percent of design. However, operation is also possible at about 90 percent of design or 10 percent below the design Wobbe index. As indicated by the dashed line in FIG. 4, the diversion of nitrogen stream 20 would for 90 percent operation, in case of an entrained-flow, slurry-fed gasifier, would be between about 20 percent and about 40 percent. Hence, the possible operational range of diversion for the entrained-flow, slurry-fed gasifier would be between about 10 percent and about 40 percent. Although not illustrated, the 90 percent operational ranges for the fluidized bed gasifier would be between about 25 percent and about 45 percent and for the entrained-flow, dry-fed gasifier would be between about 10 percent and about 35 percent. Thus, the possible operational range for the fluidized bed gasifier would be between about 10 percent and about 45 percent. The possible operational range for the entrained-flow, dry-fed gasifier would be between about 1 percent and about 35 percent. It is to be noted, that in an installation that were designed to operate at a lower temperature, the same percentages of diversion would apply.

In case of a moving bed gasifier at very high rates of carbon removal up to about 50 percent the nitrogen is diverted to the combustor. This alone will not lower the modified Wobbe index sufficiently because of limits on the availability of nitrogen from air separation unit 16. As shown by the 300° F. curve, the amount of nitrogen required is in excess of the 50 percent level. To avoid using more than about 50 percent of the available nitrogen at the highest levels of carbon removal achievable with the moving bed gasifier, stream 66 can be heated to about 550° F. Therefore, at the highest levels of carbon removal, the use of heating of the stream 66 to about 550° F. or moisturization of stream 66 to about 11 and about 13 mol % water prevents excessive diversion of the nitrogen to also help lower the modified Wobbe index. Here, between about 50 percent of the total carbon can be removed up to an amount of up to 80 percent. The amount of nitrogen diversion in such case varies from between about 40 percent to about 50 percent at the respective ends of the carbon removal.

It is to be noted, that "total carbon removed" is derived from the amount of carbon dioxide that was originally present in the feed and that produced by the shifting of the carbon monoxide to carbon dioxide and the subsequent removal of the carbon dioxide present. In FIG. 4, the variation in the carbon removal results from the degree to which the carbon monoxide is shifted. For example, in a specific retrofit, it might not be a cost effective proposition to shift 80 percent of the carbon monoxide due to the cost and complexity of the use of multiple shift reactors. It may, however, be economically prudent to shift some of the carbon monoxide with the use of less shift reactors that would be present had the carbon monoxide been shifted to the maximum extent possible. Also, it may not be possible to remove the entire carbon content of the stream due to the fact that in all cases methane is present. Hence, to the degree that less carbon monoxide is shifted for a particular type of gasifier, less carbon dioxide will exist for removal and therefore, a lower percentage of carbon will be removed.

Figure 5:
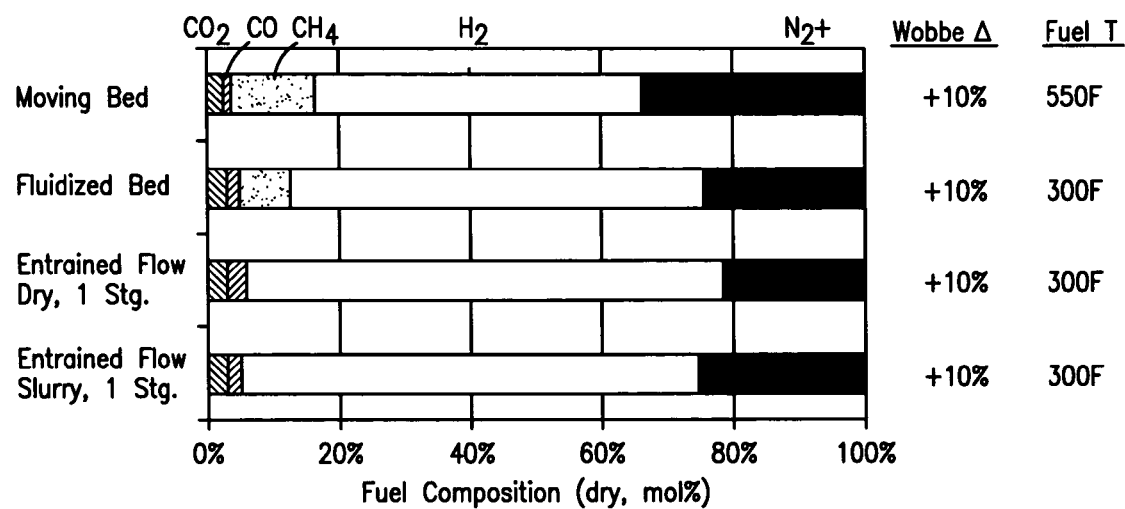
FIG. 5 is a chart of the composition of fuel streams for various gasifiers that have been treated in accordance with the present invention and that illustrates both the modified Wobbe index and the fuel temperature for the particular fuels.

With reference to FIG. 5, fuel compositions in fuel stream 66 and therefore stream 80 are illustrated in which the maximum amount of carbon atoms has been removed (i.e. about 95 percent carbon monoxide conversion and about 95 percent of carbon dioxide removal). As indicated here the modified Wobbe index has increased 10 percent from the fuel streams illustrated in FIG. 1 which is within the limit of fuel delivery systems and combustors, such as 60 and 78, respectively, that are used in connection with gas turbine 62. Moisture has not been added to fuel stream 66 but the same has been heated in heat exchanger 70 to the temperatures of the fuel stream prior to inclusion of the carbon dioxide removal.

While the present invention has been described with reference to a preferred embodiment, as will occur to those skilled in the art, numerous, changes, additions and omissions may be made without departing from the spirit and scope of the present invention.

We claim:

1. A method of reducing a modified Wobbe index of a fuel stream fed to diffusion combustors of a gas turbine to be used in an IGCC installation in which a nitrogen stream is fed into head ends of the combustors to lower NOx produced by combustion within the combustors and the modified Wobbe index of the fuel stream has been increased in an amount that is greater than at least about 10 percent of a design Wobbe index for the gas turbine due to a retrofit of the IGCC installation involving conversion of carbon monoxide within the fuel stream to hydrogen and carbon dioxide by a water gas shift reaction and removal of the carbon dioxide prior to the introduction of the fuel stream into the combustors, said method comprising:

diverting the nitrogen stream to the fuel stream so that less nitrogen is introduced into the head end of the combustors after the retrofit by dividing said nitrogen stream into first and second subsidiary streams;

the first subsidiary stream being fed into the head end of the combustor;

the second subsidiary stream being combined with the fuel stream prior to the introduction of the fuel stream into the gas turbine combustor; and the second subsidiary stream having a subsidiary flow rate that is selected to at least partially lower the modified Wobbe index of the fuel stream after mixing thereof with the second subsidiary stream to within about 10 percent or less of the design modified Wobbe index.

2. The method of claim 1, wherein the subsidiary flow rate of the second subsidiary stream is selected to fully lower the modified Wobbe index of the fuel stream to within about 10 percent or less of the design modified Wobbe index.

3. The method of claim 2, wherein the IGCC installation has a fluidized bed gasifier, the subsidiary flow rate of the second subsidiary stream is between about 10 percent and about 45 percent of the flow rate of the nitrogen stream and between about 20 percent and about 80 percent of the total carbon contained in the fuel stream has been removed due to the retrofit.

4. The method of claim 1, wherein the IGCC installation has an entrained-flow, slurry-fed gasifier, the subsidiary flow rate is between about 10 percent and about 40 percent of the flow rate of the nitrogen stream and between about 20 percent and about 90 percent of the total carbon contained in the fuel stream has been removed due to the retrofit.

5. The method of claim 1, wherein the IGCC installation has an entrained-flow, dry-fed gasifier, subsidiary flow rate is between about 1 percent and about 35 percent of the flow rate of the nitrogen stream and between about 20 percent and about 90 percent of the total carbon contained in the fuel stream has been removed due to the retrofit.

6. The method of claim 1, wherein the IGCC installation has a moving bed gasifier, the subsidiary flow rate is between about 35 percent and about 50 percent of the flow rate of the nitrogen stream, the fuel stream is heated or moisturized and between about 45 percent and about 85 percent of the total carbon contained in the fuel stream has been removed due to the retrofit.

7. The method of claim 1, further comprising adding moisture to the fuel stream to also lower the modified Wobbe index.

8. The method of claim 1, further comprising heating the fuel stream to also lower the modified Wobbe index.

* * * * *